United States Patent
Leitner et al.

(10) Patent No.: US 9,550,852 B2
(45) Date of Patent: Jan. 24, 2017

(54) METHOD FOR PRODUCING VINYL ESTER URETHANE RESINS BASED ON DIANHYDROHEXITOL COMPOUNDS AND USE THEREOF

(71) Applicant: HILTI AKTIENGESELLSCHAFT, Schaan (LI)

(72) Inventors: Michael Leitner, Landsberg (DE); Beate Gnass, Gersthofen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/437,959

(22) PCT Filed: Oct. 22, 2013

(86) PCT No.: PCT/EP2013/072058
§ 371 (c)(1),
(2) Date: Apr. 23, 2015

(87) PCT Pub. No.: WO2014/064097
PCT Pub. Date: May 1, 2014

(65) Prior Publication Data
US 2015/0299368 A1    Oct. 22, 2015

(30) Foreign Application Priority Data
Oct. 24, 2012   (DE) .................. 10 2012 219 477

(51) Int. Cl.
| | | |
|---|---|---|
| C08G 18/10 | (2006.01) | |
| C08G 18/32 | (2006.01) | |
| C08G 18/67 | (2006.01) | |
| C08F 283/00 | (2006.01) | |
| C08F 290/06 | (2006.01) | |
| C08L 75/16 | (2006.01) | |
| C08G 18/68 | (2006.01) | |
| C08G 18/73 | (2006.01) | |

(52) U.S. Cl.
CPC ....... *C08F 283/008* (2013.01); *C08F 290/067* (2013.01); *C08G 18/10* (2013.01); *C08G 18/3218* (2013.01); *C08G 18/672* (2013.01); *C08G 18/68* (2013.01); *C08G 18/73* (2013.01); *C08L 75/16* (2013.01)

(58) Field of Classification Search
None
See application file for complete search history.

(56) References Cited

U.S. PATENT DOCUMENTS

| | | | |
|---|---|---|---|
| 5,854,305 A | 12/1998 | Schwiegk et al. | |
| 8,241,879 B2 | 8/2012 | Picataggio et al. | |
| 2015/0005408 A1* | 1/2015 | Lindekens | C07C 69/54 522/170 |
| 2015/0232610 A1* | 8/2015 | Leitner | C08L 75/16 524/590 |

FOREIGN PATENT DOCUMENTS

| | | | |
|---|---|---|---|
| DE | 195 31 649 A1 | 3/1997 | |
| EP | 0 713 015 A1 | 5/1996 | |
| EP | 0 965 619 A1 | 12/1999 | |
| EP | 1 935 860 A2 | 6/2008 | |
| EP | 2 433 975 A1 | 3/2012 | |
| WO | WO 2011/098272 A2 | 8/2011 | |
| WO | WO 2012/076686 A2 | 6/2012 | |
| WO | WO 2013144033 A1 * | 10/2013 | ............. C07C 69/54 |

OTHER PUBLICATIONS

PCT/EP2013/072058, International Search Report dated Dec. 2, 2013 (Two (2) pages).

* cited by examiner

*Primary Examiner* — Robert Sellers
(74) *Attorney, Agent, or Firm* — Crowell & Moring LLP

(57) ABSTRACT

Disclosed is a method for producing vinyl ester urethane resins, in which a dianhydrohexitol-compound is reacted with a diisocyanate in the presence of a monomeric radically co-polymerizable compound as a solvent and the product is reacted with a hydroxy-substituted (meth)acrylate. As a result, vinyl ester urethane resins based on dianhydrohexitol-compounds and also based on renewable raw materials can be obtained in a simple manner with high yields. The resins are suitable as binding agents in chemical fixing engineering.

13 Claims, No Drawings

METHOD FOR PRODUCING VINYL ESTER URETHANE RESINS BASED ON DIANHYDROHEXITOL COMPOUNDS AND USE THEREOF

The invention relates to a method for producing vinyl ester urethane resins based on dianhydrohexitol compounds, the vinyl ester urethane resins produced in accordance with this method, and the use thereof as radically curable binding agents, especially for chemical fixing.

The use of reaction resin mortars based on radically curable compounds as binding agents has been known for some time. In the field of fixing engineering, the use of resin mixtures as organic binding agents, e.g., as an adhesive mass, has become accepted for chemical fixing engineering. These are bonding masses that are produced as multi-component systems, one component including the resin mixture and the other component including the curing agent. Other, usual constituent elements, such as for instance solvent, including reactive solvent (reactive diluting agent) may be included in the one and/or in the other component. By mixing the two components, the curing reaction, i.e., polymerization, is initiated by radical formation and the resin is cured to create thermosetting material. Vinyl ester resins and unsaturated polyester resins are frequently used as radically curable compounds, especially for chemical fixing engineering.

Due to their advantageous properties, vinyl ester resins and especially vinyl ester urethane resins that may be obtained using monomeric or polymeric aromatic diisocyanates and hydroxy-substituted methacrylates, such as hydroxyalkyl methacrylate, are used as the basic resins. EP 0713015 B1, for instance, describes adhesive masses having unsaturated polyester resins, vinyl ester resins including vinyl ester urethane resins as the basic resins. The compounds in such systems are based on classic petrochemistry, in which the raw materials are obtained from fossil resources like crude oil.

It is generally known that fossil resources like crude oil are not inexhaustible and must be depleted at some point in time. If the availability of fossil resources declines, there is the risk that the compounds that are essential for the high requirements imposed on chemical fixing systems may no longer be available.

Therefore there is a future need for alternative systems based on renewable raw materials having a high proportion of carbon from renewable raw materials in order to be able to continue to provide highly specialized chemical fixing systems, even in the future.

The inventors have found a way to provide a reaction resin mortar, the resin component of which includes a base resin, and possibly additional constituents such as reactive diluting agents, that have a high proportion of carbon from renewable raw materials. This is made possible in that a vinyl ester urethane resin based on a dianhydrohexitol compound, such as isosorbide, isomannite, or isoidide, is used for the basic resin. This has the advantage that for synthesizing the basic resin it is possible to use starting compounds that may be obtained in sufficient quantity and quality from renewable resources.

Isosorbide-based polymers may be produced for instance from isosorbide and dicarboxylic acids (Bart A.J. Noordover: Biobased step-growth polymers; chemistry, functionality, and applicability; Technische Universiteit Eindhoven, 2007; ISBN 978-90-386-1179-2). In this case, large amounts of corresponding polyesters are produced, wherein however only relatively small molecular masses having a mean molecular mass $\overline{M}_n$ of less than 5,000 g/mol are obtained. Such polymers do not have any polymerization-capable carbon double bonds, however, so that no cross-linked thermosetting materials are yielded in this manner.

Moreover, isosorbide-based polymers may be obtained using polycondensation of isosorbide diglycidyl ethers with, for instance, amines (Xianhong Feng, Anthony J. East, Willis Hammond, Michael Jaffe: Contemporary Science of Polymeric Materials by Korugic-Karasz, L.: ACS Symposium Series; American Chemical Society: Washington, DC, 2010). However, producing such isosorbide diglycidyl ethers requires the use of m-chloroperbenzoic acid in dichloromethane, which for industrial purposes is a very complex and expensive process.

Alternatively, bis isosorbide diglycidyl ether may be obtained by reacting isosorbide with epichlorohydrine, with the possibility of obtaining isosorbide-based polymers using polycondensation of bis isosorbide diglycidyl ethers. In this case, however, reacting isosorbide with epichlorohydrine and isolating the product make the process very expensive.

The basic resin prepared by the inventors is not simple to produce, however. The synthesized dianhydrohexitol-based vinyl ester resins are not easily accessible due to the poor solubility of the oligomeric diisocyanates yielded during the synthesis of the intermediate compound, which may be obtained by reacting the dianhydrohexitol compound with a slight excess of diisocyanate. In particular in the past it was not possible to react a C4-diisocyanate with a dianhydrohexitol compound on a large scale. The same is true for C6- and C10-diisocyanates, which in the past did not react easily with a dianhydrohexitol compound to create diisocyanate.

There is therefore a need for a method that is simple to conduct and leads to high yields, and in which method in particular it is not necessary to reprocess or separate the final product so that the reaction batch may be used directly.

The object of the invention is to provide a method for producing vinyl ester urethane resins, which method is simple to conduct and monitor and which method permits high yields of the end product.

In accordance with the invention, the object is attained in that a method for producing vinyl ester urethane resins is provided, in which method a dianhydrohexitol compound is reacted with a diisocyanate in the presence of a radically copolymerizable compound as a solvent and the product thereof is reacted with a hydroxy-substituted (meth)acrylate.

Consequently vinyl ester urethane resins are produced in a simple two-step one-pot reaction, and the result is a product that may be used directly for all fields of application and that is storage-stable.

In accordance with the invention the vinyl ester urethane resins are produced in two synthesis steps. In a first synthesis step (Synthesis Step 1), the dianhydrohexitol compound is reacted with an excess of diisocyanate so that the products necessarily have isocyanate groups at the end of the molecule and two urethane groups in the main chain of the molecule. Usefully, at least two moles of diisocyanate are used per mole of dihydroxy compound so that one isocyanate group of the diisocyanate always reacts with one hydroxy group of the dianhydrohexitol compound, forming a urethane group. However, the diisocyanate is preferably added in slight excess to largely prevent oligomerization. Nevertheless, oligomers are formed, even if only in small quantities. In a second synthesis step (Synthesis Step 2), the isocyanate terminal groups are then reacted with a hydroxy-substituted (meth)acrylate ester, so that a compound having terminal (meth)acrylate groups is obtained.

Surprisingly, the use of certain monomeric copolymerizable compounds in the first synthesis step leads to good and very good reactions in this synthesis step, so that subsequently in the second synthesis step the two terminal isocyanate groups of the dianhydrohexitol-based urethane diisocyanate may react well with hydroxy-substituted (meth) acrylates. This results in high yields of resins that are capable of polymerization.

The use of certain monomeric copolymerizable compounds during the first synthesis step is surprisingly helpful in keeping the oligomers created during the reaction in solution long enough for the reaction of the dianhydrohexitol compound to continue to completion in this synthesis step. This is the requirement for the terminal isocyanate groups to react with hydroxy-substituted (meth)acrylates in the second synthesis step, creating the appropriate di(meth) acrylates.

The reaction of the dianhydrohexitol compound with the diisocyanate proceeds in a manner known per se by combining the components.

The reaction occurs in accordance with the invention in the presence of a copolymerizable monomer as solvent, wherein this is selected from mono- or di-functional methacrylates, especially aliphatic or aromatic $C_5$-$C_{15}$-(meth) acrylates. Suitable copolymerizable monomers are: hydroxypropyl(meth)acrylate, 1,2-ethanedioldi(meth)acrylate, 1,3-propanedioldi(meth)acrylate, 1,2-butanedioldi (meth)acrylate, 1,4-butanedioldi(meth)acrylate, trimethylolpropanetri(meth)acrylate, phenyl(meth)acrylate, tetrayhydrofurfuryl(meth)acrylate, ethyltriglycol(meth) acrylate, N,N-dimethylaminoethyl(meth)acrylate, N,N-dimethylaminomethyl(meth)acrylate, acetoacetoxyethyl(meth) acrylate, isobornyl(meth)acrylate, 2-ethylhexyl(meth) acrylate, diethyleneglycoldi(meth)acrylate, methoxypolyethyleneglycolmono(meth)acrylate, trimethylcyclohexyl(meth)acrylate, 2-hydroxyethyl(meth)acrylate, dicyclopentenyloxyethyl(meth)acrylate, and/or tricyclopentadienyldi(meth)acrylate, bisphenol-A-(meth)acrylate, novolakepoxidi(meth)acrylate, di[(meth)acryloyl-maleoyl]-tricyclo-5.2.1.0.$^{26}$-decane, dicyclopentenyloxyethylcrotonate, 3-(meth)acryloyl-oxymethyl-tricylo-5.2.1.0.$^{26}$-decane, 3-(meth)cyclopentadienyl(meth)acrylate, isobornyl(meth) acrylate, and decalyl-2-(meth)acrylate; PEG-di(meth)acrylates, such as PEG200-di(meth)acrylate, tetraethylene glycol di(meth)acrylate, (2,2-dimethyl-1,3-dioxolane-4-yl)methyl (nneth)acrylate, cyclohexyl(meth)acrylate, phenoxyethyldi (meth)acrylate, methoxyethyl(meth)acrylate, tetrahydrofurfuryl methacrylate or tert-butyl(meth)acrylate, and norbornyl(meth)acrylate. It is particularly preferred that the copolymerizable monomers be selected from among butanedioldi(meth)acrylate, propylene glycol di(meth)acrylate, tetrahydrofurfuryl(meth)acrylate, and (2,2-dimethyl-1,3-dioxolane-4-yl)methyl(meth)acrylate. The copolymerizable monomers may be used alone or as a mixture of two or more thereof.

The dianhydrohexitol compound, the diisocyanate, and the solvent are provided and mixed in the reaction vessel, preferably while stirring, at room temperature, especially at +10° C. to +40° C.

The reaction then takes place at approximately +60° C. to +90° C., the mixture being heated to this temperature as rapidly as possible to prevent the mixture from adhering to the reaction vessel or stirrer. The heating preferably takes place over a period of 30 minutes to 3 hours, depending on the quantity.

The dianhydrohexitol compound is preferably reacted with the diisocyanate in the presence of a suitable catalyst. Suitable catalysts are organic metal salts and chelates, such as chromium(III)dionate, chromium(III)octoate, titanium tetrabutoxide, calcium octoate, bismuth carboxylate, zirconium acetoacetate, zirconium tetradionate complex, and zirconium tetrakis(2,4-pentanedionato) complex, as described in the publication, "Catalysis of the Isocyanate-Hydroxyl Reaction with Non-Tin Catalysts" by W.J. Blank, Z.A. He, and E.T. Hessell, 24th International Conference in Organic Coatings, Athens Greece, or zirconium alkoxides, such as zirconium tetrabutoxide, and zirconium carboxylates, such as zirconium tetraacetylacetonate, as described in WO 2012/076686 A1. Preferably used are the tin compounds normally used, such as dioctyltin dilaurate.

The dihydroxy compound is a dianhydrohexitol compound so that the starting compounds may be obtained from renewable raw materials. Dianhydrohexitol compounds, more precisely 1,4:3,6-dianhydrohexitol compounds, are by-products of the starch industry. They may be obtained for instance by dehydrating D-hexitols, which themselves may be obtained from hexose sugars using simple reduction. The dianhydrohexitol compounds are thus chiral products that may be obtained from biomasses. A distinction is made among three isomers depending on the configuration of the two hydroxy groups: the isosorbide (Structure A), the isomannite (Structure B), and the isoidide (Structure C), which may be obtained from D-glucose, D-mannose, and L-fructose using hydrogenation and then double dehydration.

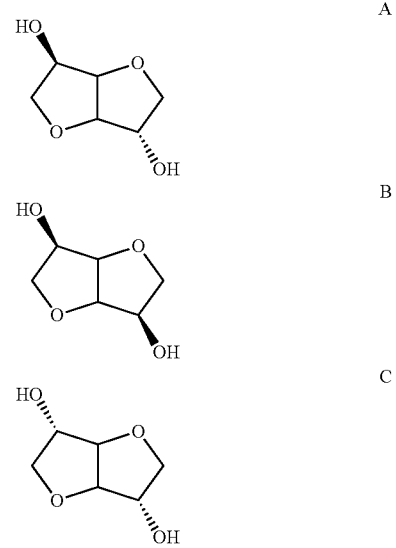

Thus, the dianhydrohexitol compound used as the starting material may be an isosorbide, isomannite, or isoidide, or it may be a mixture of these dianhydrohexitol compounds. Consequently, in the following the term dianhydrohexitol compound shall be understood to mean the specific discrete compound or any desired mixture of the various individual compounds. Since the isosorbide is the most widely distributed, it is preferably used as the starting compound for the reaction with the diisocyanate.

The dianhydrohexitol compounds and methods for producing them are known per se and corresponding products are available commercially.

So that the diisocyanate may also be obtained from renewable raw materials, the diisocyanate is usefully an aliphatic diisocyanate, especially an aliphatic $C_1$-$C_{10}$-alkyldiisocyanate based on a basic carbon unit, that may be obtained from renewable raw materials, such as tetramethylene diisocyanate, hexamethylene diisocyanate, and decamethylene diisocyanate.

Using tetramethylene diisocyanate has the advantage, for instance, that it may be obtained from a basic C-4 unit having a plant origin, specifically succinic acid (Chemical Engineering & Technology Special Issue: Change of raw materials, Volume 31, Issue 5, pages 647 (2008), in the article, "Succinic Acid: A New Platform Chemical for Biobased Polymers from Renewable Resources," by I. Bechthold, K. Bretz, S. Kabasci, R. Kopitzky, and A. Springer). The authors assume that succinic acid will be one of the future basic chemical units that may be obtained from renewable raw materials.

The use of decamethylene diisocyanate as another example also has the advantage that it may be obtained from a basic C10 unit of plant origin, specifically sebacic acid. The basic C10 unit, which may be obtained from biologically based castor oil, is described in detail in the literature (European Journal of Lipid Science and Technology, Special Issue: Oil and fats as renewable resources for the chemical industry, Volume 112, Issue 1, pages 10 (2010), in the article, "Castor oil as a renewable resource for the chemical industry," by Hatice Mutiu and Michael A.R. Meier). In this case, as well, the authors assume that castor oil is a very valuable source for renewable raw materials for the chemical industry.

In addition, since then hexamethylene diisocyanate (HMDI) from renewable raw materials has become accessible because in accordance with U.S. Pat. No. 8,241,879 the relevant precursor, adipinic acid, is accessible from a biomass.

In addition, however, other diisocyanates that may be obtained from renewable raw materials may be used in accordance with the invention, such as for instance diisocyanates from fatty acids or other sources, as described in WO 2011/098272 A2.

In accordance with the invention, the reaction of the dianhydrohexitol compound with the diisocyanate is continued until the conversion is fully complete. The conversion is determined continuously during the reaction using thin layer chromatography.

In the second step, the vinyl ester urethane resin is obtained by reacting the diisocyanate compound obtained in the first synthesis step with hydroxy-substituted (meth) acrylates. One hydroxy equivalent on hydroxy-substituted meth(acrylate) is used per isocyanate equivalent of the diisocyanate compound.

The reaction also occurs at about +60 to +90° C., the hydroxy-substituted (meth)acrylate being added directly to the reaction mixture from the first synthesis step without isolating the products that have resulted.

Once the hydroxy-substituted (meth)acrylate has been added, the reaction mixture is kept at room temperature from +60 to +90° C. until the residual isocyanate content has dropped to below 0.2%. The conversion is checked using titration of the isocyanate groups according to DIN EN 1242. Once the conversion has concluded, the reaction mixture is cooled to room temperature.

The hydroxy-substituted (meth)acrylates may also be obtained from renewable raw materials. In particular these are aliphatic hydroxyalkyl(meth)acrylates, such as hydroxypropyl(meth)acrylate and hydroxyethyl(meth)acrylate, of which the methacrylate compounds are particularly preferred.

The propylene glycol required for synthesizing the hydroxypropylmethacrylate may be obtained from glycerin (CEPmagazine.org, www.aiche.org/cep (August 2007), in the article, "A Renewable Route to Propylene Glycol," by Suzanne Shelley). Glycerin is an essential by-product of the production of biodiesel. Thus it is an inexpensive, renewable, and environmentally friendly alternative for the production of propylene glycol compared to the conventional raw material, which is obtained from crude oil.

The ethylene glycol needed for synthesizing the hydroxyethyl methacrylate may likewise be obtained from raw materials, such as ethylene oxide and derivatives thereof, for instance glycols, that may be obtained from biomasses such as molasses and sugar cane.

The $C_2$- and $C_3$-hydroxyalkyl methacrylates are available commercially.

In addition, however, other hydroxy-substituted (meth) acrylates that may be obtained from renewable raw materials may be used in accordance with the invention.

To prevent premature, undesired polymerization of the polymerizable, inventively produced reaction products and the copolymerizable monomers used during the entire production process and during storage of the reaction product, it is recommended that at least 0.0005 to 0.2 wt. %, relative to the entire reaction mixture, including any adjuvants and additives, of at least one suitable polymerization inhibitor be added even before the reaction. The at least one polymerization inhibitor may also be added during or after the reaction, however. If necessary, the polymerization inhibitor may be added up to a quantity of 2 wt. %, preferably 0.01 to 1 wt. %, relative to the entire reaction mixture.

Suitable polymerization inhibitors are hydroquinone, substituted hydroquinone, phenothiazine, benzoquinone, and tert-buthylbrenzcatachin, as they are described for instance in EP 1935860 A1 and EP 0965619 A1, stable nitroxyl radicals, also called N-oxyl radicals, such as piperidinyl-n-oxyl and tetrahydropyrrol-N-oxyl, as they are described for instance in DE 19531649 A1.

The inventively produced products represent valuable systems that may be cured by means of substances supplying radicals—substances such as (hydro)peroxides—possibly in the presence of accelerators.

The inventively produced products are preferably used as binding agent components for glues, adhesive agents, sealants, and coating agents. The inventively produced products are particularly preferred as binding agents for radically curable, especially cold-setting, mortar masses for chemical fixing.

Another subject matter of the invention is therefore the use of the inventively produced vinyl ester urethane resin as a binding agent in radically curable resin mixtures and these reaction resin mortar compositions including this resin mixture, in particular for chemical fixing.

As a rule, reaction resin mortars are produced in that the starting compounds required for producing the basic resin, together with catalysts and solvents, in particular reactive diluting agents, are combined in a reactor and caused to react with one another. Once the reaction has concluded, and possibly even at the beginning of the reaction, polymerization inhibitors are added to the reaction mixture for storage stability, so that the so-called resin master batch is obtained. Frequently accelerators for the curing of the basic resin, possibly additional polymerization inhibitors that may be the same or different from the polymerization inhibitor for storage stability, for adjusting the gel time, and possibly other solvents, in particular reactive diluting agents, are added to the resin master batch, so that the resin mixture is obtained. Inorganic and/or organic additives are added to this resin mixture for adjusting different properties, such as rheology and the concentration of the basic resin, so that the reaction resin mortar is obtained.

One preferred resin mixture consequently includes at least one basic resin, at least one reactive diluting agent, at least one accelerator, at least one polymerization inhibitor. A reaction resin mortar includes, in addition to the resin mixture just described, inorganic and/or organic additives, with inorganic additives being particularly preferred.

The inventive method shall be described in greater detail in the following examples, but shall not be limited thereto.

EXEMPLARY EMBODIMENTS

A) Syntheses of Resin Master Batches

A1) Use of Tetramethylene Diisocyanate (TMDI)

Example A1.1

260 g 1,3-propanediol dimethacrylate (Sarbio 6200) and 50 g TMDI are placed in a 500 mL three-neck flask; 30 mg dioctyltin dilaurate (Tegokat 216), 20 mg BHT, and 40 mg Tempol are added. The solution is heated to 70° C. Then 20 g isosorbide is added to the stirred solution in 20 equal portions over a period of 60 min. Once the isosorbide has been added, the mixture is heated to 70° C. and stirred at this temperature for 5 h. The conversion of the isosorbide is monitored by means of thin layer chromatography. The isosorbide had been completely converted after 5 hours. Then 50 g HPMA is added by drops over a period of 60 min and stirring is continued at 80° C. until the NCO content is less than 0.2%, measured according to DIN EN 1242. This yields a ready-to-use resin master batch.

Example A1.2

250 g 1,4-butanediol dimethacrylate and 40 g TMDI are placed in a 500 mL three-neck flask; 60 mg dioctyltin dilaurate (Tegokat 216), 40 mg BHT, and 90 mg Tempol are added. The solution is heated to 70° C. Then 20 g isosorbide is added to the stirred solution in 20 equal portions over a period of 60 min. Once the isosorbide has been added, the mixture is heated to 80° C. and stirred at this temperature for 5 h. The conversion of the isosorbide is monitored by means of thin layer chromatography. The isosorbide had been completely converted after 5 hours. Then 40 g HPMA is added by drops over a period of 60 min and stirring is continued at 80° C. until the NCO content is less than 0.2%, measured according to DIN EN 1242. This yields a ready-to-use resin master batch.

A2) Use of Hexamethylene Diisocyanate (HMDI)

Example A2.1

130 g 1,3-propanediol dimethacrylate (Sarbio 6200), 130 g 1,4-butanediol dimethacrylate, and 50 g HMDI are placed in a 500 mL three-neck flask; 30 mg kioctyltin dilaurate (Tegokat 216), 20 mg BHT and 40 mg Tempol are added. The solution is heated to 70° C. Then 20 g isosorbide is added to the stirred solution in 20 equal portions over a period of 60 min. Once the isosorbide has been added, the mixture is heated to 80° C. and stirred at this temperature for 5 h. The conversion of the isosorbide is monitored by means of thin layer chromatography. The isosorbide had been completely converted after 5 hours. Then 50 g HPMA is added by drops over a period of 60 min and stirring is continued at 80° C. until the NCO content is less than 0.2%, measured according to DIN EN 1242. This yields a ready-to-use resin master batch.

Example A2.2

250 g (2,2-dimethyl-1,3-dioxolate-4-yl)methyl methacrylate (solketal methacrylate) and 45 g HMDI are placed in a 500 mL three-neck flask; 30 mg dioctyltin dilaurate (Tegokat 216), 30 mg BHT, and 40 mg Tempol are added. The solution is heated to 70° C. Then 20 g isosorbide is added to the stirred solution in 20 equal portions over a period of 60 min. Once the isosorbide has been added, the mixture is heated to 80° C. and stirred at this temperature for 5 h. The conversion of the isosorbide is monitored by means of thin layer chromatography. The isosorbide had been completely converted after 5 hours. Then 45 g HPMA is added by drops over a period of 60 min and stirring is continued at 80° C. until the NCO content is less than 0.2%, measured according to DIN EN 1242. This yields a ready-to-use resin master batch.

A3) Use of Decamethylene Diisocyanate (DMDI)

Example A3.1

230 g 1,3-propanediol dimethacrylate (Sarbio 6200) and 60 g DMDI are placed in a 500 mL three-neck flask; 60 mg dioctyltin dilaurate (Tegokat 216; Goldschmidt Industrial Chemical Corporation), 40 mg butylhydroxytoluene (BHT), and 90 mg 4-hydroxy-2,2,6,6-tetramethylpiperidine-N-oxl (Tempol) are added. The solution is heated to 70° C. Then 20 g isosorbide is added to the stirred solution in 20 equal portions over a period of 60 min. Once the isosorbide has been added, the mixture is heated to 80° C. and stirred at this temperature for 5 h. The conversion of the isosorbide is monitored by means of thin layer chromatography. The isosorbide had been completely converted after 5 hours. The mixture is diluted with 35 g tetrahydrofurfuryl methacrylate (Sarbio 6100; Sartomer) to reduce its viscosity. Then 40 g HPMA is added by drops over a period of 60 min and stirring is continued at 80° C. until the NCO content is less than 0.2%, measured according to DIN EN 1242. This yields a ready-to-use resin master batch.

B) Resin Mixtures

B1) Use of Tetramethylene Diisocyanate (TMDI)

Example B1.1

100 g 1,4-butanediol dimethacrylate (BDDMA) and 2 g tert-butyl-brenzcatachin (tBBK) are added to 380 g of the resin master batch produced in accordance with Example A1.1 at 50° C. and the gel time is then set to 6 minutes at room temperature and an aromatic amine is added. This yields a ready-to-use, storage-stable resin mixture.

Example B1.2

90 g BDDMA and 2 g tBBK are added to 350 g of the resin master batch produced in accordance with Example A1.2 at 50° C. and the gel time is then set to 6 minutes at room temperature and an aromatic amine is added. This yields a ready-to-use, storage-stable resin mixture.

B2 Use of Hexamethylene Diisocyanate (HMDI)

Example B2.1

100 g BDDMA and 2 g tBBK are added to 380 g of the resin master batch produced in accordance with Example A2.1 at 50° C. and the gel time is then set to 6 minutes at room temperature and an aromatic amine is added. This yields a ready-to-use, storage-stable resin mixture.

Example B2.2

90 g BDDMA and 2 g tBBK are added to 360 g of the resin master batch produced in accordance with Example A2.2 at 50° C. and the gel time is then set to 6 minutes at room temperature and an aromatic amine is added. This yields a ready-to-use, storage-stable resin mixture.

B3) Use of Decamethylene Diisocyanate (DMDI)

Example B3.1

40 g BDDMA and 2 g tBBK are added to 300 g of the resin master batch produced in accordance with Example A3.1 at 50° C. and the gel time is then set to 6 minutes at room temperature and an aromatic amine is added. This yields a ready-to-use, storage-stable resin mixture.

The invention claimed is:

1. A method for producing a vinyl ester urethane resin, comprising the steps of:
   (I) reacting a dianhydrohexitol compound with a diisocyanate in a presence of a monomeric radically copolymerizable compound as a solvent to produce a product; and
   (II) reacting the product with a hydroxy-substituted (meth)acrylate.

2. The method according to claim 1, wherein the monomeric radically copolymerizable compound is 1,4-butanedioldi(meth)acrylate, propyleneglycol(meth)acrylate, tetrahydrofuryl(meth)acrylate, or (2,2-dimethyl-1,3-di oxol ane-4-yl)m ethyl (m eth)acryl ate.

3. The method according to claim 1, wherein at least two moles of diisocyanate are used per mole of the dianhydrohexitol compound.

4. The method according to claim 1, wherein the dianhydrohexitol compound is isosorbide, isomannite, or isoidide.

5. The method according to claim 1, wherein the diisocyanate is an aliphatic diisocyanate.

6. The method according to claim 1, wherein the hydroxy-substituted (meth)acrylate is a hydroxyalkyl(meth)acrylate.

7. The method according to claim 1, wherein the reaction is continued in step (I) until a residual isocyanate content has dropped to less than 0.2% measured according to DIN EIN 1242.

8. The method according to claim 1, wherein starting compounds are obtained from chemicals based on renewable raw materials.

9. A vinyl ester urethane resin obtained using the method according to claim 1.

10. The vinyl ester urethane resin of claim 9, wherein the vinyl ester urethane resin is a binding agent in radically curable resin mixtures.

11. The vinyl ester urethane resin of claim 9, wherein the vinyl ester urethane resin is a binding agent in radically curable reaction resin mortar compositions.

12. The vinyl ester urethane resin according to claim 10 wherein the resin mixtures are used for chemical fixing.

13. The vinyl ester urethane resin according to claim 11 wherein the resin mortar compositions are used for chemical fixing.

* * * * *